United States Patent [19]

Weber et al.

[11] 4,338,161
[45] Jul. 6, 1982

[54] DEVICE FOR DRY COOLING GLOWING COKE

[75] Inventors: Heinrich Weber, Recklinghausen; Kurt Lorenz, Hattingen; Horst Dungs, Herne, all of Fed. Rep. of Germany

[73] Assignee: Firma Carl Still GmbH & Co. KG, Fed. Rep. of Germany

[21] Appl. No.: 249,157

[22] Filed: Mar. 30, 1981

[30] Foreign Application Priority Data

Apr. 10, 1980 [DE] Fed. Rep. of Germany ....... 3013722

[51] Int. Cl.$^3$ ................... C10B 39/02; C10B 45/00
[52] U.S. Cl. ................................... 202/228; 201/39
[58] Field of Search .................... 201/34, 39, 41, 43; 202/95, 253, 227, 228; 34/10, 19, 27, 31, 35

[56] References Cited

U.S. PATENT DOCUMENTS

| 3,728,230 | 4/1973 | Kemmetmueller | 201/39 |
| 4,259,158 | 3/1981 | Weber et al. | 201/34 |
| 4,260,458 | 4/1981 | Weber et al. | 202/228 |

FOREIGN PATENT DOCUMENTS

| 601392 | 8/1934 | Fed. Rep. of Germany. | |
| 1080968 | 10/1954 | Fed. Rep. of Germany | 202/228 |
| 1091080 | 10/1960 | Fed. Rep. of Germany | 202/228 |
| 1471589 | 3/1969 | Fed. Rep. of Germany. | |
| 2432025 | 1/1976 | Fed. Rep. of Germany. | |
| 2952065 | 2/1981 | Fed. Rep. of Germany. | |

OTHER PUBLICATIONS

"Energieruckgewinnung Durch Trockene Kokskuhlung", Gluckauf; 114; Nr. 14; 1978; pp. 611-617.

Primary Examiner—Bradley Garris
Attorney, Agent, or Firm—McGlew and Tuttle

[57] ABSTRACT

An apparatus and arrangement is disclosed for cooling glowing coke in a dry circuit which utilizes a cooling chamber divided by cooling walls into a plurality of parallel vertically extending cooling channels. The cooling walls are supplied with a cooling medium for indirectly cooling the glowing coke. A coke discharge mechanism in the form of a chute having a comb-like end and paddle wheels between the teeth of the comb is provided at the bottom of each cooling channel to discharge coke from the cooling chamber in a controlled fashion to an underlying after-chamber. Each cooling channel is provided with cooling gas for directly cooling the glowing coke. An arrangement utilizing the apparatus supplies cooling gas directly to the cooling channels which, after passing out of the cooling chamber, passes into a waste heat boiler which is supplied with water so that it is heated by the now hot cooling gas to produce steam. Cooling water is also provided to the cooling walls for producing additional steam and for being heated in the waste heat boiler.

10 Claims, 7 Drawing Figures

Fig. 7 ic gas drops by about 75%.

DEVICE FOR DRY COOLING GLOWING COKE

FIELD AND BACKGROUND OF THE INVENTION

The present invention relates to coke treatments in general and, in particular, to a new and useful arrangement for dry cooling glowing coke in a closed chamber with recovery of the sensible heat, where the coke gives off its heat partly directly to an inert circulating gas and partly indirectly over cooling surfaces to a cooling liquid.

A number of dry coke cooling methods are known where the sensible heat of the coke is removed in a cooling shaft by a circulating, possible inert gas which gives off its heat to a following steam boiler.

A compilation of various methods working on this principle, as well as the necessary equipment can be found in "Glueckauf" 114 (1978) No. 14, p. 611 ff.

In the course of the last years, dry coke cooling plants have gained importance where the coke is at first introduced in charges into an antechamber arranged above the cooling chamber proper, from where it flows continuously into the cooling chamber underneath, depending on the discharge rate of the completely cooled coke, e.g., according to German Auslegungschrift Nos. 2,432,025 and 1,471,589. With an irregular coke yield, e.g., due to a breakdown in the conveyor system, the cooling of the coke with the resulting generation of steam can be kept constant for some time by means of the antechamber. The cooling of the coke in the cooling chamber is effected exclusively by direct heat exchange with the inert circulating gas blown in counterflow through the coke charge, which gives off the absorbed heat again directly or indirectly, to other media.

In this type of cooling, it is necessary to blow and circulate very large amounts of cooling gas through the coke charge. Particularly the high cooling gas velocities at the upper, outer end of the cooling chamber have the effect in the known cooling devices that considerable amounts of coke dust must be deposited to avoid excessive wear and fouling of the lines and equipment.

According to German Auslegungschrift No. 1,471,589, the gas drain system between antechamber and cooling tank consists of channels distributed over the entire circumference of the chamber and extending obliquely upward, and of a ring conduit arranged around the antechamber into which the channels open. After issuing from the coke charge, the gas is conducted immediately through a few small brick channels at high speed into the ring conduit. Cleaning of these channels is practically impossible.

In addition to these methods and arrangements for dry coke cooling with direct heat exchange of the coke and circulating gas, an arrangement for the dry quenching of coke in a closed chamber which is surrounded by water cooling pipes is known from German Pat. No. 601,392.

The cooling water pipes are fed from the bottom through distributing pipes and a tank, while at the top, they are in communication with the atmosphere over a pipe whose outlet is arranged above a drain.

In these methods, the coke can only be cooled in the cooling chamber in charges and not continuously and the cooling time is, as a rule, at least 3 to 4 hours, which requires a great number of cooling tanks per battery.

In addition to the above-mentioned methods, a method has also been suggested by German Patent Application No. P 29 52 065.8, filed on Dec. 22, 1979, wherein circulating gas for dry cooling is conducted directly in counterflow, and the cooling is also effected by means of indirect cooling surfaces. The coke is cooled in a round chamber with an antechamber, and the coke issues from the chamber through an opening in the center of the conical bottom.

This method and the necessary equipment have worked quite well on the whole. Some improvement, however, is still needed regarding the indirect heat transfer from the glowing coke to the cooling medium. This is due, to a certain extent, to the fact that the coke sinks at the edges in this arrangement until it issues from it.

SUMMARY OF THE INVENTION

The problem underlying the present invention consists in eliminating the aforementioned drawbacks. This problem is solved by designing the cooling chamber as a rectangular box which is subdivided by parallel cooling walls traversed by the cooling medium into cells in intervals of 600 mm to 1200 mm, depending on the quality of the coke, where a coke drain arranged under each cooling cell which discharges the cooled coke into an after-chamber and where all of the coke outlets are identical, so that they discharge the same amount of coke per unit area and can be driven over one or more synchronous drives, so that they also discharge the same amount of coke per unit time.

The cooling walls in turn can be completely traversed by cooling media, but they can also be subdivided into cells or consist completely of pipes.

The invention ensures that the coke has the same sinking velocity over the entire cross-section. This is achieved in that a dosing drain, which is bonded by the parallel walls and by walls perpendicular thereto, is arranged at the bottom end of each partial shaft. In a special embodiment, this is a discharge chute which terminates in a comb at the front end. Equal amounts of coke are lifted by means of a rotating fork system from each chute and dropped into the following after-chamber. All of the forks rotate in synchronism, which has the effect that the coke layer sinks uniformly over the entire cross-section of the chamber.

Cooling gas channels crossing the chambers are arranged above the discharge system. The cooling gas is distributed evenly over the entire cross-section of the shaft and over the cells through calibrated slots provided in the cooling gas channels.

This design has the effect that the cooling of the coke is so improved that the effective cooling height could be decreased. The required specific cooling volume is reduced by 22% (from 4.5 m³/t coke to 3.5 m³/t coke).

The cooperation of indirect cooling walls with the cooling gases has a particularly intensive cooling effect, so that about 50% of the coke heat to be eliminated is already converted to steam in the cooling shaft by means of the cooling walls designed as evaporators. This has the result that the consumption of a cooling gas drops to about 50%. Although the heat transfer coefficient drops, probably due to the lower velocity of flow in the coke bed, the cooling is increased, if we include the indirect cooling surfaces. Due to the fact that the amount of cooling gas drops by about half, the total resistance to the circulating cooling gas decreases to about 30%. The input of the motor driving the circulating blower drops to about 20%, compared to a pure scavenging gas operation.

Since a very high portion of the coke heat is already converted to steam in the cooling shaft, and the amount of cooling gas drops to about 50%, it is possible to make the waste heat boiler relatively smaller and simpler. In the extreme case, it consists only of a super-heater and a feed water preheater. Due to the fact that the amount of cooling gas drops considerably, the gas velocities in the coke bed are low. The result is that only small amounts of dust are discharged from the coke bed. The outlet velocities, related to the free outlet cross-section, are about 1.5 m/sec. This way, only particles of about 500 mm can be discharged and only one cycle is required ahead of the circulating blower to remove the dust from the circulating gas.

The invention permits a substantial reduction of the height of the coke cooler, thus reducing the pressure losses and the investment and operating costs.

Since an after-chamber in which the cooled coke can be collected is arranged after the cooling shaft, it is possible to fully maintain the generation of steam in the boiler for an hour or more, depending on the size of the antechamber and after-chamber, even when the discharge of coke has stopped. This is not possible in any of the known methods.

Due to the parallel arrangement of the plane diaphragm walls of the evaporator surface, it is possible to use substantially identical elements for larger power units.

The new design also permits a simple extension of the cooling box by providing additional cooling walls, so that an entire battery of cooling cells is formed. The original capacity of the cooling device can thus be doubled or tripled by providing a corresponding number of cooling walls. In this case, the cooling shaft is provided with two or three feed openings. The after-chamber is arranged underneath the cooling shaft, and has, in its center, a low-lying scraper belt, so that the coke can be discharged sideways. The sidewalls of the after-chamber are inclined so that the coke can slide down to the belt at any time.

It is of particular advantage that the uplift in these cooling walls is so strong that they can be operated with natural circulation. A circulating pump is not required. In order to protect the cooling surfaces, they must only have to carry a thin water film, for which a special steam cylinder is installed which supplies only these cooling surfaces. It is connected with another steam cylinder which is arranged higher than the first steam cylinder and which supplies the waste-heat boiler with water. This arrangement ensures that the entire water content of the boiler and that of the second steam cylinder are available in the cooling box for cooling the coke.

Accordingly, an object of the present invention is to provide an apparatus for dry cooling coke, comprising, means defining a cooling chamber having a hot coke inlet, a plurality of cooling walls for carrying a cooling medium for indirectly cooling the coke, extending across the cooling chamber and dividing the cooling chamber into a plurality of parallel vertical cooling channels having a top inlet for the hot coke from the hot coke inlet and a bottom outlet, a coke discharge mechanism at the bottom of each cooling channel for the controlled discharge of coke from each cooling channel, means below each coke discharge mechanism defining an after-chamber for receiving coke from the cooling channels, direct cooling gas feed means in each cooling channel above the coke discharge mechanism having a sloping top for deflecting the coke, each direct cooling gas feed means supplying cooling gas for directly cooling the coke to its respective cooling channel, and valve means connected to the direct cooling gas feed means for regulating the amount of cooling gas supplied to each cooling channel.

Another object of the invention is to provide an additional arrangement for the apparatus for treating the glowing coke to dry cool it.

A further object of the invention is to provide such an apparatus and arrangement which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
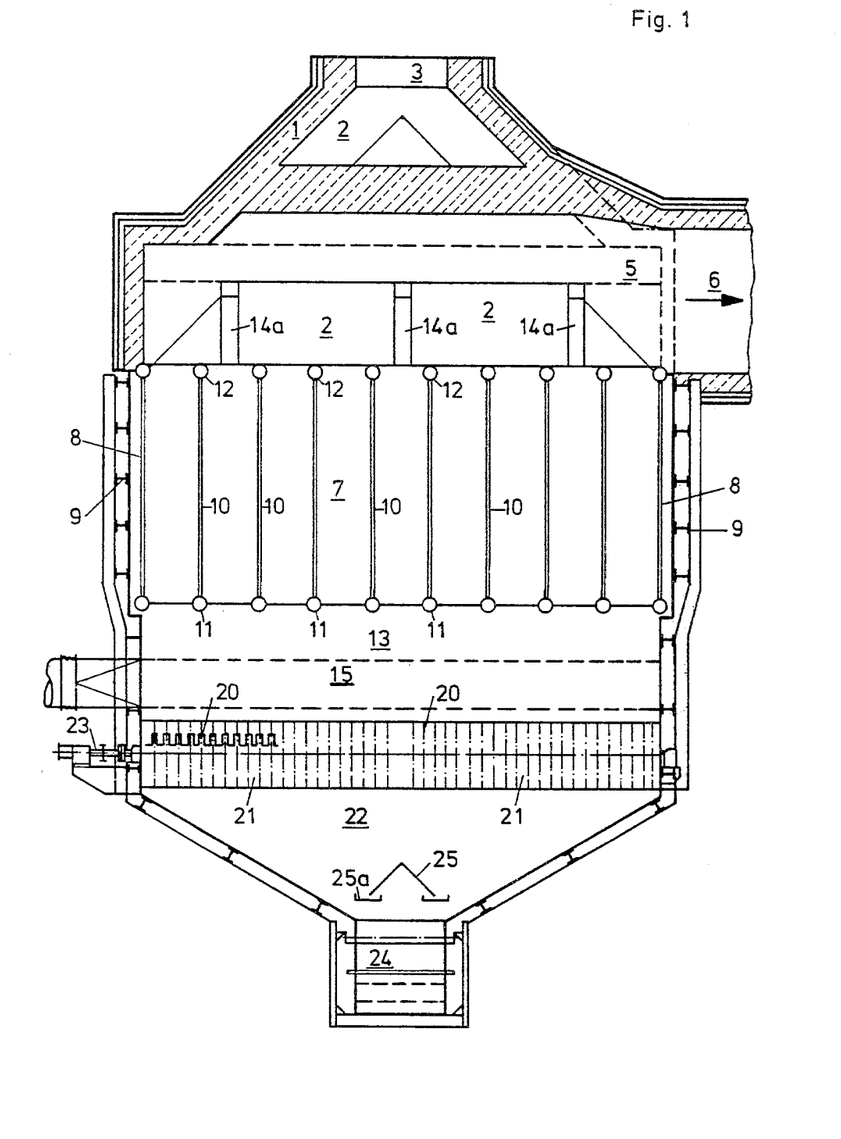
FIG. 1 is a side sectional view through the cooling chamber of the inventive device, including the antechamber and after-chamber, taken along line 1—1 in FIG. 3.
Figure 2:
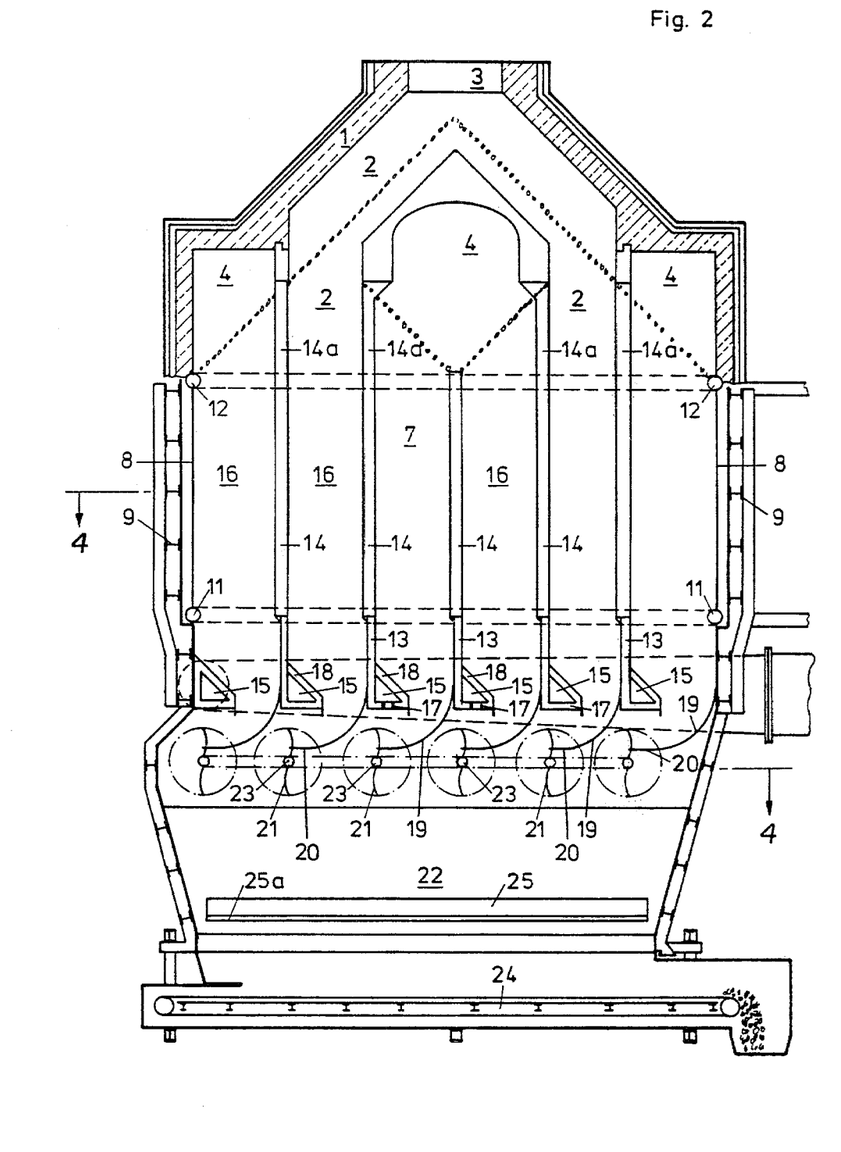
FIG. 2 is a front sectional view through the cooling chamber, including the antechamber and after-chamber, taken along line 2—2 in FIG. 3.
Figure 3:
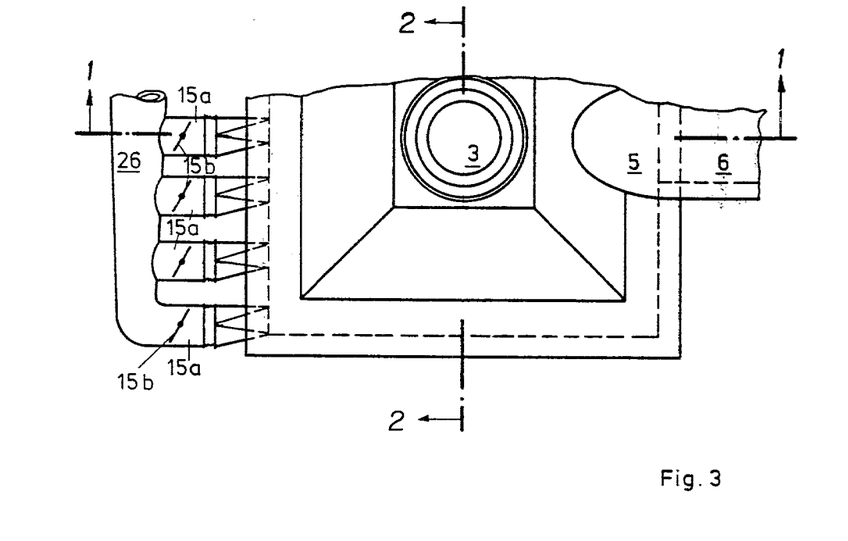
FIG. 3 is a partial top plan view of the antechamber and of the cooling chamber of the inventive device.
Figure 4:
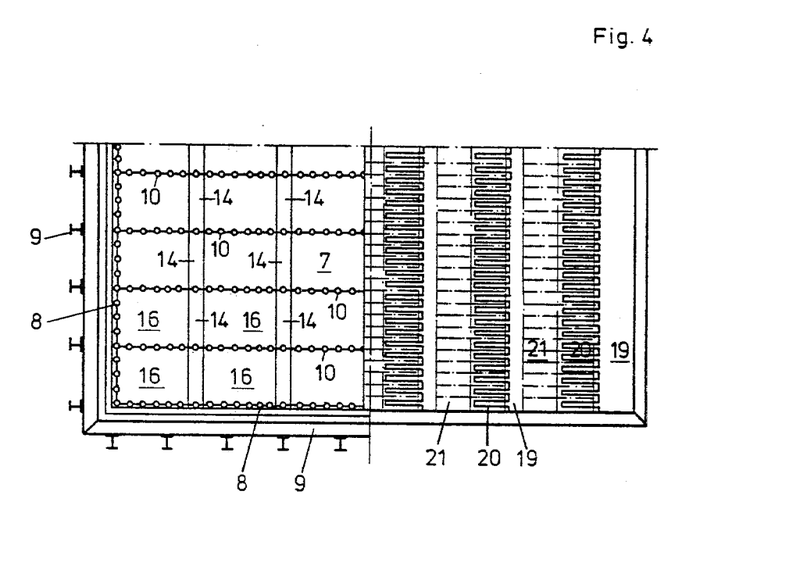
FIG. 4 is a partial horizontal sectional view through the cooling chamber taken along the line 4—4 in FIG. 2.
Figure 5:
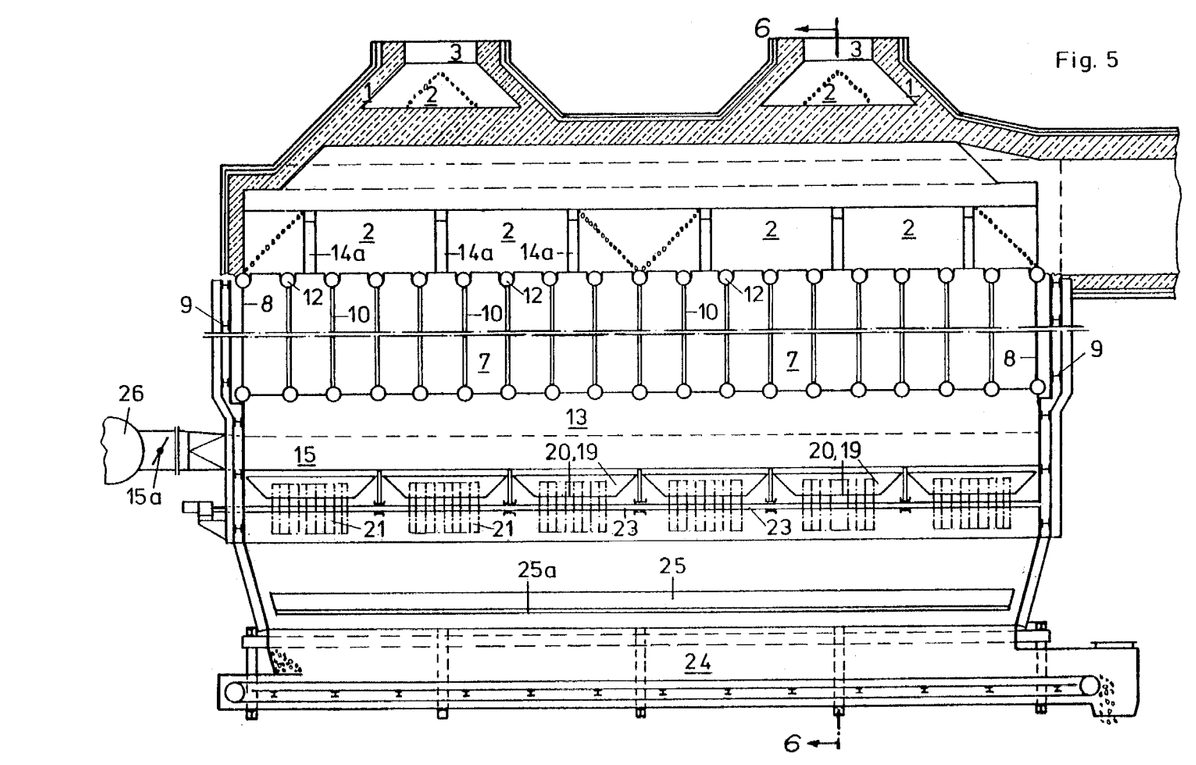
FIG. 5 is a sectional view similar to FIG. 1 through a cooling chamber having two feed openings, including an antechamber and after-chamber, taken along line 5—5 in FIG. 6.
Figure 6:
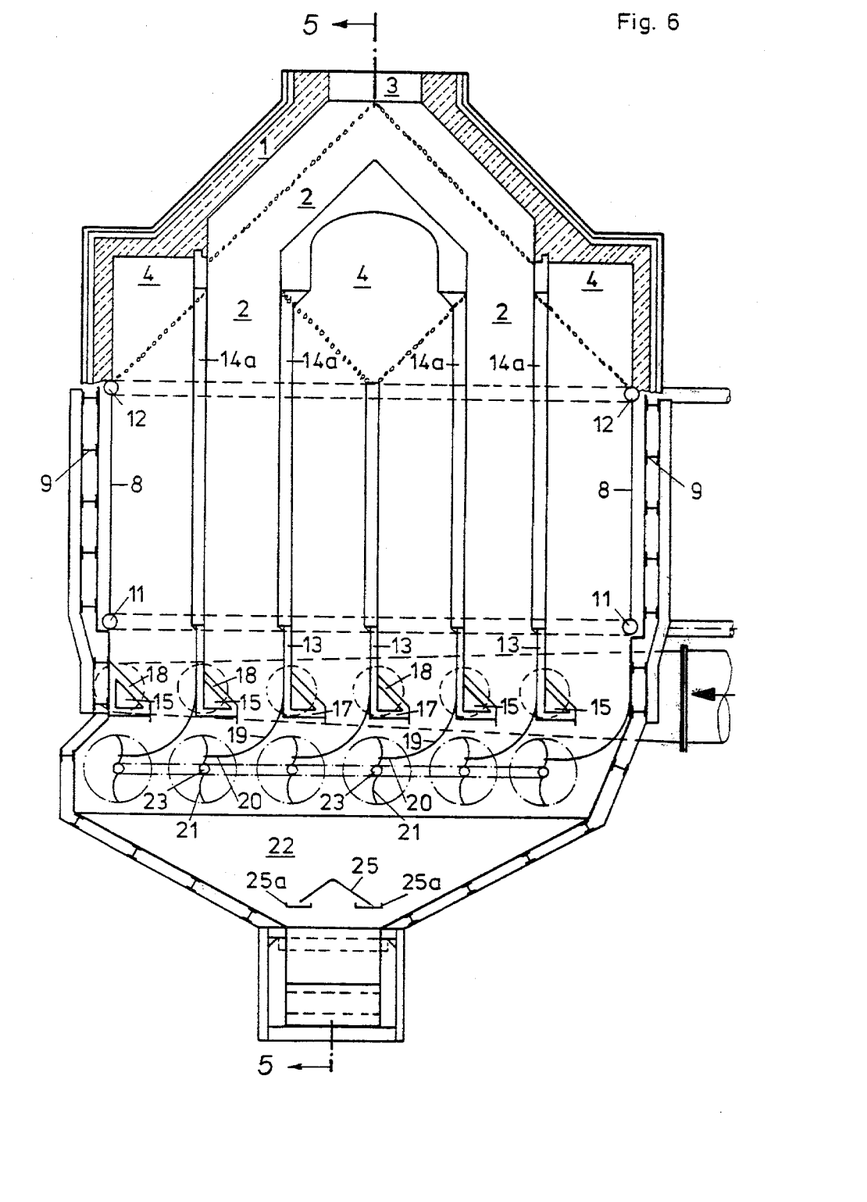
FIG. 6 is a sectional view through the cooling chamber, including the antechamber and after-chamber, taken along line 6—6 in FIG. 5.

Referring to the drawings in particular, the invention embodied therein in FIG. 1, comprises, an apparatus for dry cooling glowing coke comprising a cooling chamber 7 in the middle of a quenching housing which has an antechamber 2 above and an after-chamber 22 below. Glowing coke enters an inlet 3, descends into the antechamber 2, and then falls, in a controlled fashion, through a plurality of cooling channels defined in the cooling chamber 7, to the after-chamber 22. The embodiment of FIG. 5 differs from that of FIG. 1 in that a plurality of coke inlets 3 are provided which supply the cooling chambers 7.

The coke cooling device consists of an antechamber 2 lined with refractory insulating material 1, with a feed opening 3 for the hot coke and parallel and horizontal discharge channels for the heated inert circulating gas, a collecting channel 5 and a gas outlet channel 6.

A vertical cooling chamber 7, with a square or rectangular cross-section, is arranged under the antechamber. Cooling chamber 7 has outer walls 8 which are designed in the upper part as water-cooled diaphragm walls, e.g., in pipe-pipe-, pipe-web-pipe, or fin-pipe fashion. In order to avoid deformations of the diaphragm walls, a circumferential supporting frame 9 is arranged on the outside. In order to increase the cooling surfaces, additional water-cooled, plane diaphragm walls 10 with distributing pipes 11 and collecting pipe 12 are arranged parallel to an outer surface in intervals of 600 mm to 1200 mm, depending on the particle size of the coke.

The distributors of the diaphragm walls are mounted on steel supporting walls 13 extending perpendicularly thereto. At their tops, the supporting walls continue as partitions 14 serving as a guide for the coke and gas, and for stabilizing the diaphragm walls 8 and 10. Supports 14a are provided on partitions 14, for carrying the antechamber. Along the bottom range of supporting walls 13, a cooling gas feed channel 15 with a triangular cross-section is arranged. Cooling shaft 7 is divided by diaphragm walls 10 and partitions 14 into vertical single shafts 16 of the equal cross-sections.

At the base of single shafts 16, the cooling gas is introduced in dosed amounts over calibrated openings 17 in cooling gas feed chambers 15 into the coke charge of single shafts 16. Slope 18 of the cooling gas feed channel 15 absorbs the coke charge pressure, and brings chute 19 into action, on which the coke flow is deflected and comes to a stop at the front end of each chute, designed as a comb 20. The prongs of a rotating drop 21 protrude through the teeth of comb 20 and drop a constant amount of coke with each engagement from the front end of chute 19 into after-chamber 22. The drop forks, which are underneath a cooling gas feed channel, are all arranged on a common shaft 23. All of the shafts extend to the outside of the chamber and have a common drive (not shown). The drive is infinitely variable, so that the coke sinking velocity is the same in all single shafts 16 and can be readily adapted to the respective optimum cooling power or to the respective coke throughput capacity. After-chamber 22 has inclined lateral surfaces along which the coke slides down to the lowest point, (see FIG. 1) where a scraper belt 24, whose speed is infinitely variable, conveys the coke to the outlet.

The coke can be collected in after-chamber 22 for about an hour, even if the coke gauges fail or the evacuation of the coke drops. A protective roof 25 prevents scraper belt 24 from being over-filled. A stripping device 25a charges the coke in dosed amounts onto the scraper belt.

The cooling gas is conducted through the distributing pipes from line 26, and the open feeders 15a to cooling gas feed channels 14. In each open feeder, an adjusting valve 15b for adjusting the amount of gas is arranged, so that an even distribution of the cooling gas over the entire cross-section of cooling shaft 7 is ensured.

Figure 7:
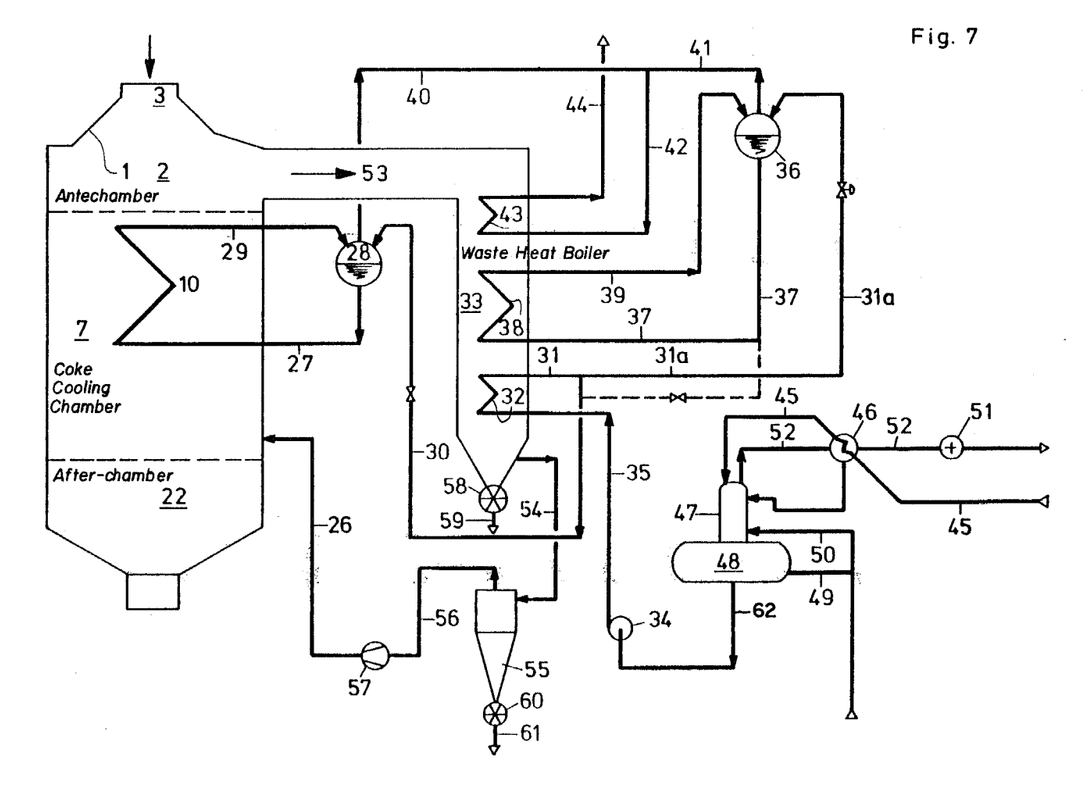
FIG. 7 is a circuit diagram of the cooling chamber connected to a waste-heat boiler of the invention.

The arrangement according to the invention works as follows (see FIG. 7):

The coke is charged into antechamber 2 through feed openings 3. After staying there for about one hour, it arrives at cooling chamber 7, where it gives off its heat, on the one hand, to evaporator surfaces 10 and, on the other hand, to the cooling gas supplied through line 26. The cooled coke is discharged from the cooling chamber in small amounts evenly over the entire crosssection into after-chamber 22. The hot water flows to evaporator surfaces 10 through line 27 from boiler drum 28 in a natural cycle.

The saturated steam generated in evaporator surfaces 10 flows through line 29 to boiler drum 28 which is fed through line 30 with water preheated to about the temperature of saturated steam. As a rule, this is a partial current which, coming through line 31 from feed water preheater 32 of waste heat boiler 33, is branched off.

The second partial current is forced by boiler feed water pump 34 through lines 35 and 31a into boiler drum 36, from where the boiler water flows through line 37, evaporator 38, and as steam through line 39 to boiler 36. The steam of boiler drum 28 and of boiler drum 36 flows through lines 40, 41 and 42 through superheater 43 and temperature-controlled through line 44 to the load (not shown) which uses the steam.

The boiler feed water is forced through line 45 and heater 46 to deaerator dome 47 of deaerator 48. Deaerator 48 is heated by means of steam-over lines 49 and 50. It is operated under a vacuum sufficient for full deaeration at a water temperature of 50° C. The vacuum is produced by a vacuum pump 51 over line 52. The deaerated water is drained from deaerator 48 with a temperature of 50° C. through line 62 by pump 34 and is forced into feed water preheater 32. The cooling gas, heated by the coke in cooling chamber 7 to about 800° C., flows through line 53 to waste-heat boiler 33 and gives off its sensible heat there to cooling surfaces 43, 38 and 32. The cooling gas is then exhausted from there by blower 57 (in line 26) with a temperature of about 150° C. through line 54, cyclone 55, and line 56, and is forced through line 26 to coke cooler 7.

The cooling gas cycle is so operated, as far as pressure is concerned, that a pressure difference relative to the atmospheric pressure of about ±0 mm water column exists at the feed opening. This means that there is a vacuum from antechamber 2 over waste-heat boiler 33 and cyclone 55 to blower 57. The dust carried along by the cooling gas current when issuing from cooling chamber 7 through line 53 has already been partly deposited at the base of waste-heat boiler 33. This dust is discharged over bucket wheel 58, and goes through line 59 in the atmosphere. The other dust portion is deposited by cyclone 55 and goes into the atmosphere over bucket wheel 60 and line 61.

While specific embodiments of the invention have been shown and described in detail to illustrate the application of the principles of the invention, it will be understood that the invention may be embodied otherwise without departing from such principles.

What is claimed is:

1. An apparatus for dry cooling coke, comprising:
   means defining a cooling chamber having a hot coke inlet;
   a plurality of cooling walls for conveying a cooling medium extending across said cooling chamber, dividing said cooling chamber into a plurality of parallel vertically extending cooling channels having a top inlet for hot coke from said hot coke inlet and a bottom outlet;
   a coke discharge mechanism at the bottom of each cooling channel for the controlled discharge of coke from each cooling channel;
   means below each coke discharge mechanism defining an after chamber for receiving coke from said cooling channels;
   direct cooling gas feed means in each cooling channel above said coke discharge mechanism for supplying cooling gas to directly cool coke in each of said cooling channels, said direct cooling gas feed means having a sloping top for deflecting coke descending in each respective cooling channel; and valve means in each of said direct cooling gas feed means for directing the amount of cooling gas supplied to each cooling channel.

2. An apparatus, according to claim 1, wherein each cooling wall comprises a plurality of pipes for carrying the cooling medium.

3. An apparatus, according to claim 1, including a plurality of hot coke inlets.

4. An apparatus, according to claim 1, including means defining an antechamber above said cooling chamber, a gas outlet communicating with said antechamber, a waste heat boiler connected to said gas outlet with indirect heat exchange means extending therein for cooling gas coming from said antechamber through said gas outlet, said waste heat boiler connected to said direct cooling gas feed means for feeding cooling gas to said cooling channels.

5. An apparatus, according to claim 4, including a first steam cylinder connected between an inlet and an outlet of said cooling walls for tapping steam produced by heat from cooling medium extending through said cooling walls, and a second steam cylinder connected between an inlet and an outlet of said heat exchange means extending through said waste heat boiler for extracting steam produced by heat in cooling gas flowing through said waste heat boiler.

6. An apparatus, according to claim 1, including a cooling jacket extending around said cooling chamber for carrying a cooling medium.

7. An apparatus, according to claim 1, including a steam cylinder connected between an inlet and an outlet of said cooling walls forming a cooling circuit for the cooling medium, said cooling circuit feeding cooling medium by gravity and pressure from steam in said steam cylinder.

8. An apparatus, according to claim 1, including an inclined chute at the bottom of each of said cooling channels extending toward said coke discharge mechanism, an edge of each chute being comb-shaped in the vicinity of each coke discharge mechanism, each coke discharge mechanism having paddles extending between forks of the comb-shaped chute end to discharge coke from each respective cooling channel in a controlled fashion.

9. An apparatus, according to claim 1, including means interconnecting each of said coke discharge mechanisms for driving each mechanism synchronously and simultaneously.

10. An arrangement for the dry cooling of glowing coke in a closed cooling chamber with recovery of its sensible heat, where the coke gives off its heat partly directly to an inert circulating gas, and partly indirectly over cooling surfaces to a cooling liquid, comprising, means defining a cooling chamber having a rectangular box-shape which is subdivided into cells, depending on the quality of the coke, in intervals of 600 mm to 1200 mm by vertical parallel cooling channels which are traversed by cooling media, each cooling cell being connected to a coke discharge device which discharges the cooled coke into means defining an after-chamber, all of the coke discharge devices being the same and being driven over at least one synchronous drive, cooling gas feed channels with outlet nozzles and a slope arranged in the cells above the discharge device, and a control valve for controlling the cooling gas current.

* * * * *